United States Patent

Goreham et al.

[11] 4,013,746
[45] Mar. 22, 1977

[54] METHODS OF MANUFACTURE OF SEMICONDUCTOR BODIES

[75] Inventors: Kenneth A. Goreham, London; John R. Perry, Daventry, both of England

[73] Assignee: Smiths Industries Limited, London, England

[22] Filed: Apr. 21, 1975

[21] Appl. No.: 570,328

[30] Foreign Application Priority Data

May 2, 1974 United Kingdom ............ 19282/74

[52] U.S. Cl. .................................. 264/66; 106/44; 264/61
[51] Int. Cl.² ........................................ C04B 35/56
[58] Field of Search ................... 264/61, 66; 106/44

[56] References Cited

UNITED STATES PATENTS 3,376,367   4/1968   Subramanya et al. ............... 106/44

*Primary Examiner*—Donald J. Arnold
*Assistant Examiner*—John Parrish
*Attorney, Agent, or Firm*—Pollock, Vande Sande & Priddy

[57] ABSTRACT

A method of manufacture of a semiconductor pellet of an electric surface-discharge igniter of a gas-turbine engine begins with a mixture of 60% by weight silicon-carbide particles of 600 British Standard Mesh size, and 40% by weight of powdered alumino-silicate or other silica glass, containing 85% silica. The mixture is heated to 1250° C. to coat the silicon-carbide particles with silica, and then when cool is milled down to 150 British Standard Mesh size. After being mixed with an organic binder the mixture is dried and then sifted through a sieve of 30 British Standard mesh on to a sieve of 60 British Standard mesh. The portion of the material retained on the latter seive is compacted in a press under 50,000 pounds per square inch into the annular pellet-form and sintered to a temperature of 1500° C. in a non-oxidizing atmosphere. The portion of silicon carbide in the initial mixture may in general vary between 45% and 75% by weight, with the range between 50% and 70% being particularly suitable, and between 55% and 65% especially advantageous, in the manufacture of igniter pellets. The silicate constituent which may contain between 75% and 95% silica by weight, may be provided by a metal oxide that will react with silicon carbide to produce the required non-conductive metal silicate during the heating. The initial heating before compaction may in general be carried out at between 1150° C. and 1300° C.

16 Claims, 12 Drawing Figures

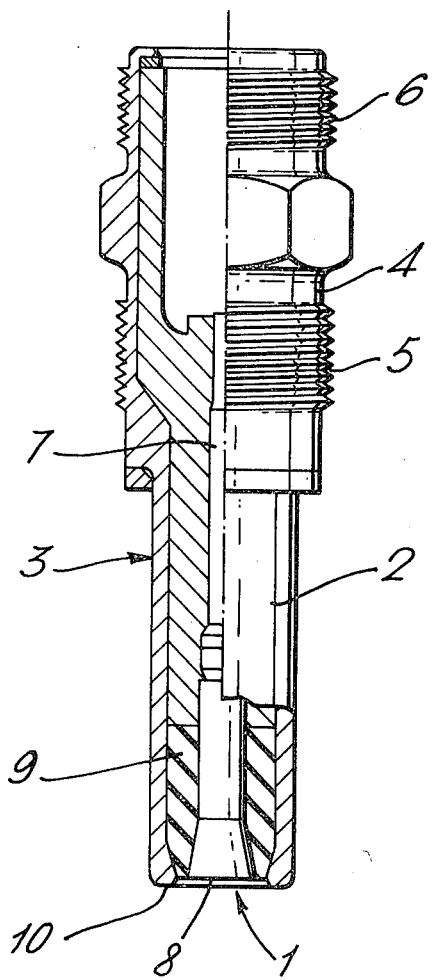

METHODS OF MANUFACTURE OF SEMICONDUCTOR BODIES

This invention relates to methods of manufacturing semiconductor bodies and to the products of such methods.

The invention is particularly concerned with methods in which particles of silicon carbide are compacted with a silicate or silicate-forming material. In this respect the invention is directed especially towards the manufacture of semiconductor bodies suitable for use in electric surface-discharge igniters.

Surface-discharge igniters are used for initiating and maintaining ignition of the fuel-air mixture in a gas-turbine engine. With such igniter a pellet of silicon-carbide material is positioned between electrodes of the igniter that are separated from one another across an exposed surface of the pellet at the operative tip of the igniter within the combustion chamber of the engine. Application of high voltage between the electrodes causes electric discharge to take place across the semi-conductive surface and it is this discharge which ignites the fuel-air mixture in the combustion chamber. The semiconductive material is subject to considerable thermal and mechanical shock during operation and this leads to erosion and possible disintegration of the pellet, which limits the useful life of the igniter.

It has been found that improvement in resistance to shock and disintegration of the semiconductive body, can be obtained by reducing the porosity of the material, and it is an object of the present invention to provide a method of manufacture by which this can be achieved.

According to the present invention there is provided a method of manufacturing a semiconductor body, comprising the steps of heating a particulate mixture containing silicon carbide and silicate or silicate-forming material to coat the silicon carbide particles with silica, compacting the mixture following said heating and then sintering the compacted body.

It has already been proposed (Subramanya et al U.S. Pat. No. 3,376,367, issued Apr. 2, 1968) to manufacture a semiconductor body for an igniter using steps of heating and compaction and involving a mixture containing silicon carbide and silicate material, but not with the compaction performed following initial heating. In particular, it has been proposed in said prior U.S. patent to use a method in which a mixture of, by weight, 65% to 85% of silicon carbide and 15% to 35% of a non-conductive metal-silicate (or a compound that will provide such a silicate during the subsequent sintering), is compacted or pressed into an article of the desired shape, heated to between 975° C. and 1315° C., and then fired in a bed of silicon carbide grains at a temperature in excess of 1445° C. Up to 15% by weight of a metal oxide may be added to the mixture of silicon carbide and silicate, and in this respect one composition proposed involves 70% silicon carbide of a particle size capable of passing through a screen of 600 American Standard mesh, 27.5% yttrium silicate and 2.5% aluminum oxide.

The method of the present invention comprises an improvement of the Subramanya et al method discussed above, characterized by the fact that the mixture is heated to coat the silicon-carbide particles with silica before compaction.

The coating of the silicon carbide particles with silica before compaction has the effect of reducing oxidation of the silicon carbide during the subsequent sintering step. This would appear to enable the glass more readily to wet the silicon carbide particles in the compacted body during sintering, so as to pull them together, increasing the density and thereby reducing porosity. There is a loss of mass from the mixture during heating when silicon monoxide is given off and the silicon carbide particles are coated with silica. But since this loss occurs in the improved method of the present invention before the mixture is compacted, it does not have significant effect on the porosity of the final product. This is in contrast to the situation that applies in the earlier Subramanya et al proposal referred to above where the comparable loss takes place after compaction, and oxidation of the silicon carbide particles during sintering may hamper wetting by the silica.

With the method of the present invention the possibility of oxidation taking place during sintering may be further significantly reduced by carrying out that step in a non-oxidizing atmosphere.

The mixture used in the method of the present invention may, more especially, include between 45% and 75%, by weight, of silicon carbide in particulate form of one or more mesh sizes within the range 400 to 1200 British Standard Mesh. The silicate used is preferably a silica glass, that is to say a glass containing 75% to 95%, by weight, of silica together with a fluxing material for reducing the melting temperature of the silica; the fluxing material may be, for example, one or more of the oxides of aluminum, barium, beryllium, boron, caesium, lithium, magnesium, potassium, rubidium, sodium, strontium, titanium and yttrium. The mixture may be heated to between 1150° C. and 1300° C. during the first heating operation, and the compacted body to between 1400° C. and 1600° C. in a non-oxidizing atmosphere during the second heating operation.

When silicon carbide constitutes between 50% and 70% of the total weight of the mixture, the resultant body is especially suitable for use as a pellet in a surface-discharge igniter. The provision of an igniter including such a pellet provides a further aspect of the present invention, and the percentage, by weight, of silicon carbide is advantageously between 55% and 65%, in this context.

A method in accordance with the present invention for manufacturing a semiconductor body for use as the pellet of a surface-discharge igniter, will now be described. The surface-discharge igniter incorporating the pellet of the invention will be described also with reference to the accompanying drawing which shows the igniter partly in section.

In the method to be described silicon carbide of a particle size to pass through a screen of 600 British Standard mesh, is mixed with powdered silica glass in the ratio 60% to 40%, by weight. The silica glass, which may be an alumino-silicate glass, includes 85% silica by weight, and the mixture is milled for 65 hours to mix the silicon carbide and the silica glass thoroughly. A rubber-lined mill containing rubber pebbles is used for the milling, so that contamination of the mixture is minimized.

The mixture is next loaded in a crucible and placed in a kiln. The kiln is raised to a temperature of 1250° C. over a period of 4 hours and is maintained at that temperature for half an hour before being allowed to cool.

Any contaminants which may have arisen in the mixture during the milling operation burn off, and as the temperature is raised the particles of silicon carbide become coated with a layer of silica. This layer arises mainly from the silica glass but also partly from oxidation of some of the silicon carbide. The silica forms a protective layer over the particles of silicon carbide, thus minimizing the possibility of oxidation of the silicon carbide during subsequent heating.

The material is now milled in a porcelain mill using alumina pebbles. Milling is continued until the material is reduced to a powder that will pass through a screen of 150 British Standard mesh.

In order to provide a degree of cohesion to facilitate handling of the powder in the next operation, it is now mixed into a paste with an organic binder. The binder, for which a mixture of wax emulsion, glycerol and water has been found satisfactory, does not form part of the final semiconductive body, being burnt away during a second sintering step to be described later. The paste is dried at a temperature of 80° C. for 3 hours, and the resulting material is sifted through a sieve of 30 British Standard mesh on to a sieve of 60 British Standard mesh. The portion of the material retained on this latter sieve is of the particle size required for the remaining operations, and is loaded into a press. The material is loaded into a die of the configuration appropriate to that desired of the final article and is compacted in the press under a pressure of 50,000 pounds per square inch.

The compacted body produced in the die is sintered. This is carried out by firing it in a kiln that is raised to a temperature of 1500° C. over a period of quarter of an hour and is maintained at this temperature for 5 minutes. The firing is carried out in an atmosphere of argon, but any other non-oxidizing atmosphere may be used. The temporary binder burns away during this heating operation.

It is undesirable for a loss of mass, other than that due to the elimination of the organic binder, to occur in the article after it has been pressed, since this decreases the density and increases the porosity of the body. The reaction by which loss of mass could arise through conversion of some of the silicon carbide to silicon monoxide and then to silica in the sintering of the compacted body, is avoided to a large extent in the present method by the initial heating operation that establishes the protective coating of silica on the particles of silicon carbide before pressing. The possibility of oxidation taking place during the sintering of the final firing is further reduced by the provision of the non-oxidizing atmosphere.

Shrinkage (that is to say a reduction in volume of the article) is desirable during the final firing, since this serves to increase the density of the resulting body. This will occur provided the mixture has been compressed sufficiently during the pressing stage. The melting of the silica glass that takes place during the sintering will in these circumstances bring about shrinkage of the body enhancing the density of the final product.

It is noteworthy that the composition of the mixture of silicon carbide and silica glass does not change appreciably throughout the process. During the initial heating operation some of the silicon is lost from the silicon carbide by conversion to gaseous silicon monoxide, but this is a very small percentage of the amount present. The silicon carbide is protected by the silica coating at a very early stage in the manufacturing process, so that the initial composition of 60% silicon carbide and 40% silica glass has been found to change to only approximately 59% silicon carbide and 41% silica glass, by the end of the process.

Contaminants that may form on the surface of the semiconductive body can be readily removed by rubbing with abrasive material.

The method described above is of especial advantage in the provision of a semiconductive pellet for a surface-discharge igniter such as shown in the accompanying drawing. The construction of the igniter and the form of the pellet incorporated therein, will now be described.

Referring to the drawing, the operative tip 1 of the igniter is located at one end of a substantially-cylindrical nose 2 of a tubular metal shell 3 that provides the external surface of the igniter. The shell 3 above the nose 2 is of enlarged diameter to provide a head 4 having screw threads 5 for use in mounting the igniter in the gas-turbine engine with the nose 2 projecting into the combustion chamber.

Screw threads 6 on the head are for engagement by an electrical connector that serves to establish both an earth or ground connection with the shell 3, and an electrically 'live' connection internally of the head 4 with a metal rod 7. The rod 7, which is electrically insulated from the shell 3, extends axially along the nose 2 to the tip 1 where it flares outwardly to provide a central electrode 8 of the igniter. The central electrode 8 is separated from the shell 3 at the tip 1 by an annular body or pellet 9 of silicon carbide manufactured by the method described above. The pellet 9 provides at the tip 1 an exposed surface across which the central electrode 8 is separated from the grounded counter electrode formed by the annular rim 10 of the shell 3.

The general tubular configuration of pellet 9 is conveniently produced directly in the pressing operation of the manufacturing method, using a die of annular cross-section. The sintered pressing is ground to provide the precise profile required for good abutment between the flared electrode 8 and the shell 3. The end surface of the pellet 9 which is to be exposed at the tip 1 may be cleaned of possible contaminants at the same time.

Application of some two thousand volts between the rod 7 and shell 3 is effective to cause electric discharge to take place across the exposed surface of the pellet 9 between the electrode 8 and the encircling rim 10. This is effective to ignite the fuel-air mixture within the combustion chamber of the gas-turbine engine.

It has been found with such an igniter that the useful life is increased by virtue of the ability of the semiconductive pellet manufactured by the method of the present invention, more readily to withstand mechanical as well as thermal shock.

The composition of the particulate mixture used in the method of the present invention may vary as indicated earlier from the precise composition of 60% silicon carbide and 40% silicate referred to in connection with the method described in detail above. Furthermore, the silicate constituent of the mixture may be provided by a material that will react to produce the silicate during the heating of the mixture. In this connection the oxides of aluminum, zirconium, magnesium, beryllium, lanthanum, yttrium, calcium, strontium and barium, are all possible materials that will react under heat with the silicon carbide to provide an appropriate non-conductive metal silicate.

We claim:

1. In a known method of manufacturing a semiconductor body, comprising the step of compacting a mixture containing particulate silicon carbide and the step of sintering said mixture, said mixture including a nonconductive silicate material to provide a nonconductive silicate matrix for said silicon-carbide particles during said sintering step, the improvement wherein the said mixture is heated to coat said silicon carbide with nonconductive silicate matrix material, milling said coated silicon carbide, and compacting said coated silicon carbide.

2. The improvement of claim 1 wherein said mixture contains between 45% and 75% of silicon carbide by weight.

3. The improvement of claim 1 wherein said mixture contains between 55% and 65% of silicon carbide by weight.

4. The improvement of claim 1 wherein said sintering step is performed in a non-oxidizing atmosphere.

5. The improvement of claim 1 wherein said material to form said silicate matrix is a silicate glass containing between 75% and 95% of silica by weight.

6. The improvement of claim 1 wherein said material to form said silicate matrix is an alumino-silicate glass.

7. A method of manufacturing a semiconductor pellet for a surface-discharge igniter comprising a first step of forming a particulate mixture containing between 50% and 70% by weight of silicon-carbide particles, the balance of said mixture consisting essentially of a nonconductive silicate a second step of heating said mixture to a temperature in the range of 1150° C. to 1300° C. to coat the silicon-carbide particles with said nonconductive silicate, a third step, performed subsequently to said second step of heating, of milling said mixture containing said nonconductive silicate coated silicon-carbide particles, a fourth step of compressing said coated particles into a unitary body, and a fifth step, performed subsequent to said compressing step, of sintering said unitary body at a temperature in the range of 1400° C. to 1600° C. in a non-oxidizing atmosphere.

8. A method according to claim 7 wherein said silicon-carbide particles are of a size to pass through a screen of 600 British Standard mesh.

9. A method according to claim 7 including the step of milling said mixture following said second step, the step of sifting said milled mixture through a first screen of 30 British Standard mesh onto a second screen of 60 British Standard mesh, and the step of then loading the portion of the mixture retained by said second screen into a press for said third step of compacting.

10. A method according to claim 7 wherein said material is a silica glass.

11. A method of manufacturing a semiconductor pellet for a surface-discharge igniter comprising a first step of forming a particulate mixture containing 60% by weight of silicon carbide and 40% by weight of a nonconductive silica glass, a second step of heating said mixture to a temperature of substantially 1250° C. to coat the silicon-carbide particles with said silica glass, a third step performed subsequently to said second step of milling said coated silicon carbide particles, and a fourth step of compacting said mixture into a unitary body, and a fifth step of sintering said unitary body at a temperature of substantially 1500° C.

12. A method according to claim 11 wherein said silica glass is an alumino-silicate glass.

13. A method according to claim 11 wherein said silicon-carbide particles are of a size to pass through a screen of 600 British Standard mesh.

14. A method according to claim 11 including the step of milling said mixture following said second step, the step of sifting said milled mixture through a first screen of 30 British Standard mesh onto a second screen of 60 British Standard mesh, and the step of then loading the portion of the mixture retained by said second screen into a press for said third step of compacting.

15. A method according to claim 11 wherein said mixture is compacted under a pressure of substantially fifty thousand pounds per square inch.

16. A method of manufacturing a semiconductor pellet, comprising a first step of forming a particulate mixture containing 50% to 70% by weight of silicon-carbide particles which pass through a 600 British Standard mesh, and 30% to 50% by weight of silica glass; a second step of heating said mixture to a temperature in the range of 1150° C to 1300° C for a period of at least half an hour in an oxidizing atmosphere; a third step of milling the product of said second step down to a powder to pass through a 150 British Standard mesh; a fourth step of adding a binder to said powder to produce a paste; a fifth step of drying said paste; a sixth step of sifting the dried paste through a first screen of 30 British Standard mesh onto a second screen of 60 British Standard mesh; a seventh step of loading the portion of the said dried paste retained by said second screen into a compaction press; an eighth step of operating said press to compact the said dried paste into a unitary body; and a ninth step of sintering said unitary body at a temperature in the range of 1400° C to 1600° C in a non-oxidizing atmosphere for at least 5 minutes.

* * * * *